United States Patent
Waitkoss et al.

[11] 3,754,179
[45] Aug. 21, 1973

[54] REMOTE POSITION CONTROL SYSTEM INCLUDING ELECTRIC MOTOR AND CONTROL CIRCUIT THEREFOR

[75] Inventors: Alex J. Waitkoss, Oswego; Robert A. Suding, Aurora, both of Ill.

[73] Assignee: Waitkoss Company, Inc., Aurora, Ill.

[22] Filed: June 5, 1972

[21] Appl. No.: 259,904

[52] U.S. Cl. .................................. 318/665, 318/696
[51] Int. Cl. ............................................. G05b 1/06
[58] Field of Search ..................... 318/665, 625, 696

[56] References Cited
UNITED STATES PATENTS

| | | | |
|---|---|---|---|
| 3,020,458 | 2/1962 | Morgan | 318/665 X |
| 3,453,517 | 7/1969 | Kennedy et al. | 318/257 |
| 2,384,622 | 9/1945 | Isserstedt | 318/665 |
| 3,302,112 | 1/1967 | Hyer | 318/665 X |

*Primary Examiner*—B. Dobeck
*Attorney*—Foorman L. Mueller et al.

[57] ABSTRACT

An electric motor is connected to a device to be positioned and is controlled by a control circuit including a potentiometer device which provides a variable resistance in the control circuit. The potentiometer device may include a pair of potentiometers which are simultaneously controlled to control the direction and speed of the motor. The potentiometer device has a rotor and a stator, both of which are mounted for movement, with one part, such as the rotor, positioned by a stepping motor. The stepping motor may be operated by pulses from a pulse generator, and the pulses may also be applied to a counter. When a particular number of pulses are received, the counter can act to terminate the supply of pulses to the stepping motor so that it stops. The shaft of the drive motor is coupled to the other movable part of the potentiometer device, such as the stator, to return the parts to the initial relative position. The control circuit supplies current to the drive motor to energize the same when the parts are displaced from the initial relative position, and supplies no current when the parts are at such initial position to stop the motor.

15 Claims, 4 Drawing Figures

Patented Aug. 21, 1973 3,754,179

Patented Aug. 21, 1973  3,754,179

REMOTE POSITION CONTROL SYSTEM INCLUDING ELECTRIC MOTOR AND CONTROL CIRCUIT THEREFOR

BACKGROUND OF THE INVENTION

Various systems have been used for remote control of a motor for the positioning of a device. For example, servosystems and numerical control systems have been used for remote control. However, existing systems have been quite expensive, and have not been suitable for use in general applications. Some prior systems have provided only a limited movement of the device being positioned. Also, a system for controlling a small motor for low speed operation has not been suitable for controlling a large motor for high speed operation, etc.

Although some prior systems have had provisions for determining when the apparatus being moved is in the desired position, these have required complex electrical circuits for responding to the indication of position and providing the desired control. Such systems have been tailored for specialized applications, and are not suitable for general use.

SUMMARY OF THE INVENTION

It is an object of the present invention to provide a simple position control device which is suitable for use in a wide variety of different applications.

Another object of the invention is to provide a position control device which includes an electric drive motor and a control system therefor, wherein the same control system provides satisfactory operation for applications which require drive motors in a wide range of sizes, and wherein the amount of movement possible is variable through a wide range.

A further object of the invention is to provide a position control system which responds to applied electric signals, such as pulses, and wherein the extent of movement is controlled by control of the number of pulses applied.

A still further object of the invention is to provide a motor control circuit for accurately positioning apparatus coupled thereto, wherein the drive motor operates at higher speeds when a greater movement is required, with the speed increasing gradually at the start and decreasing gradually at the end of the movement.

In practicing the invention a position control system is provided which includes an electric drive motor which may be a direct current motor, energized by a control circuit which supplies rectified direct current from an alternating current supply. The control circuit may be of known configuration including silicon controlled rectifiers for controlling the current supplied to the motor, and unijunction transistors for controlling the silicon controlled rectifiers. A balanced system can be provided for applying current of opposite polarities to the motor for driving the same in opposite directions. The control circuit is controlled by a potentiometer device which may include a rotor structure and a stator structure, both of which are mounted for movement. When the rotor and stator are in an initial relative position, the control circuit provides no current to the motor so that it is at rest. When the rotor is moved in one direction with respect to the stator, the resistance of the potentiometer controls the unijunction transistors so that current of one polarity is applied to the motor, and when the rotor is moved in the opposite direction with respect to the stator, current of the opposite polarity is applied to the motor. One of the movable parts of the potentiometer device, such as the rotor, is positioned by a stepping motor which is energized by a pulse generator. A counter may also be connected to receive the pulses. The counter can include means for presetting a particular number, and when the set number of pulses is received the counter operates to terminate the application of pulses to the stepping motor. Accordingly, the stepping motor will move by an extent determined by the number of pulses applied. The shaft of the drive motor is coupled to the other movable part of the potentiometer, such as the stator, and as the motor drives the apparatus being positioned, the stator moves in a direction to return the potentiometer to its initial relative position.

When the control system is started by the application of pulses to the stepping motor, the rotor of the potentiometer is displaced from the initial position and the motor starts. Although the motor may start very quickly, there will be some lag in the movement of the motor with respect to the movement of the potentiometer rotor. This will increase the displacement of the rotor from the stator so that the speed of the motor will increase. When the motor reaches a speed at which the stator of the potentiometer moves at the same speed as the rotor, the motor will operate at constant speed. When the movement of the rotor stops, the stator will continue to move until the initial relative position of the potentiometer parts is reached and no current is supplied to the motor. As the stator approaches the initial relative position, the motor will slow down and then stop. The speed of the motor varies with the speed of the pulses applied which can be controlled for any desired speed.

DETAILED DESCRIPTION

Figure 1:
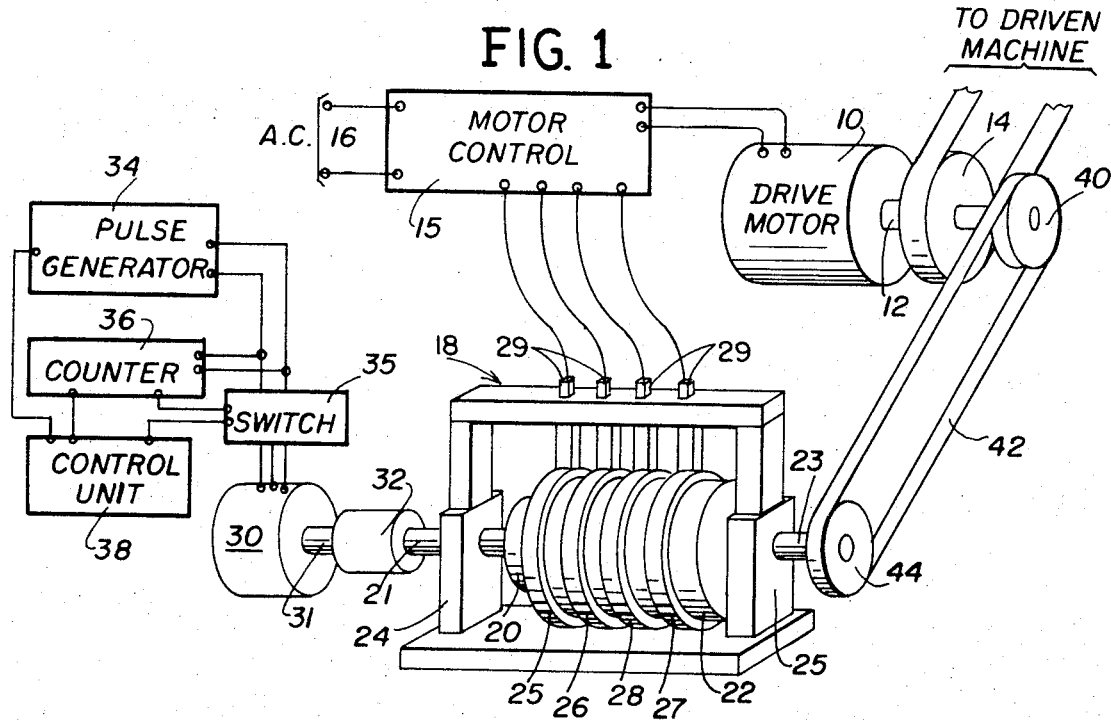
FIG. 1 is a schematic diagram of the position control system of the invention.

Referring now to the drawings, FIG. 1 shows schematically the control system of the invention. The drive motor 10 may be a reversible direct current motor of standard construction. This includes a drive shaft 12 to which a pulley 14 is connected to drive the member to be positioned. Alternatively, a coupling may be connected to the drive shaft 12 to directly drive another shaft, such as a lead screw for positioning a device. The motor 10 is energized by control circuit 15 which is connected to an alternating current supply 16. The motor control circuit provides direct current to the motor 10 and controls the polarity and magnitude of the current supplied.

Connected to the control circuit 15 is a potentiometer device 18 having a rotor 20 and a stator 22. A shaft 21 extends from the rotor 20, and a second coaxial shaft 23 extends from the stator 22. A supporting structure has bearings for supporting the shafts 21 and 23, including a support 24 for the shaft 21 and a support 25 for the shaft 23. The potentiometer 18 is supported so that both the rotor and stator can be independently rotated, and the relative position of the rotor with respect to the stator can be changed. This relative position can change through an angle slightly less than 360°.

The potentiometer device 18 includes a plurality of slip rings 25, 26, 27 and 28 on the stator 22 thereof, which are engaged by brush contacts 29 connected to the control circuit 15. Since the stator 22 is rotatable and may operate through several complete rotations, as will be explained, it is necessary to have slip ring connections from the stator of the potentiometer device to the motor control circuit.

A stepping motor 30 has a shaft 31 connected through coupler 32 to the shaft 21 connected to the rotor 20 of the potentiometer 18. The stepping motor 30 is energized by pulse generator 34 and moves through a precise angular increment in response to each pulse applied. The stepping motor is a standard item such as a SLO-SYN stepping motor sold by Superior Electric Company, Bristol, Connecticut.

The output of the pulse generator 34 is also connected to counter 36 which counts the pulses applied thereto. The counter can be a standard counter such as the Predetermining Counter, Series 7702, sold by Veeder-Root, Hartford, Connecticut. Such a counter has manual means for setting the count to which a response is desired, and provides an output when the number of pulses for which it is set is applied thereto. Counters of other types can be used, such as counters which are controlled electrically. The counter 36 is coupled to the switch device 35 to interrupt the supply of pulses to the stepping motor 30.

A control unit 38 is coupled to the pulse generator 34 to initiate the application of pulses to the stepping motor 30. The control unit 38 is also connected to the counter 36 to reset the same, and may also set the count to which it responds. The switch device 35 connected between the pulse generator 34 and the stepping motor 30 can control the application of pulses to the stepping motor to cause it to rotate in one direction or the other. The switch device 35 can be controlled by the control unit 38 to operate the system in a particular direction.

A coupling is provided from the shaft 12 of the drive motor 10 to the shaft 23 connected to the stator of the potentiometer device 18. This is provided by pulley 40 on the shaft 12, which is connected through belt 42 to the pulley 44 on the shaft 23. This coupling turns the stator 22 in the same direction that the rotor 20 is turned by the stepping motor 30, so that the stator 22 of the potentiometer device 18 follows the rotor 20 thereof.

Figure 2:
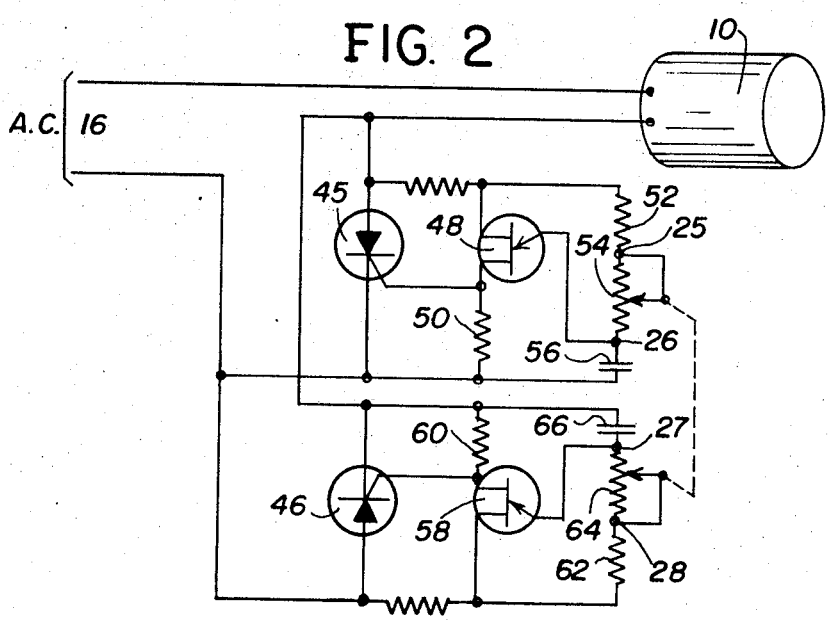
FIG. 2 is a circuit diagram of the motor control circuit and the connection of the potentiometer device therein.

FIG. 2 illustrates one circuit configuration of a motor control circuit which can be used in the system of the invention. The motor control circuit may be of the type sold by General Electric Co. under the trademark STATOTROL, and which is identified as a high performance reversing SCR drive.

The control circuit is connected in series with the motor 10 across the alternating current supply 16. The control circuit includes silicon controlled rectifier 45 for supplying current of one polarity to the motor 10 and silicon controlled rectifier 46 for supplying current of the opposite polarity. The silicon controlled rectifier (SCR) 45 is controlled by the voltage across resistor 50, which is connected in series with unijunction transistor 48. The unijunction transistor 48 selectively controls current flow through resistor 50 to control the voltage thereacross which is applied to the gate of the SCR 45.

The unijunction transistor 48 is connected to a circuit including fixed resistor 52, potentiometer 54 and capacitor 56. Capacitor 56 charges through resistor 52 and potentiometer 54 to develop a voltage thereacross which is applied to the emitter electrode of the unijunction transistor 48. When this voltage reaches the threshold level of the unijunction transistor 48, this transistor will conduct to cause current flow through resistor 50 to trigger the SCR 45 so that current is applied therethrough to the motor 10. The alternating current from supply 16 turns off the SCR 45 during the half cycle when the anode is negative with respect to the cathode thereof, and the portion of each alternate half cycle during which the SCR conducts depends upon the triggering of the transistor 48. This, in turn, depends upon the setting of the potentiometer 54. When the resistance in series with the capacitor 56 is reduced, the capacitor will charge more rapidly to fire transistor 48 more quickly, so that the SCR 45 conducts for a longer portion of the half cycle. This applies more current to the motor 10 so that it runs faster.

The circuit connected to silicon controlled rectifier 46 is identical to that connected to the silicon controlled rectifier 45. This includes unijunction transistor 58 connected in series with resistor 60, and a threshold circuit including resistor 62, potentiometer 64 and capacitor 66. When the potentiometer 64 is set so that capacitor 66 charges to a value to exceed the threshold of unijunction transistor 58, this will cause current flow through resistor 60 to trigger the silicon controlled rectifier 46. The rectifier 46 applies current to the motor 10 which is of opposite polarity to that applied through the silicon controlled rectifier 45, with the amount of current depending upon the setting of potentiometer 64, as stated above in connection with the circuit including potentiometer 54.

Figure 3:
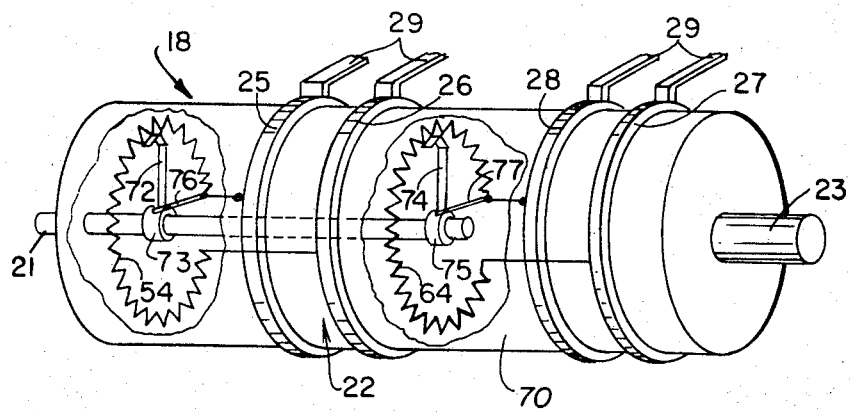
FIG. 3 shows the construction of the potentiometer device.

The potentiometers 54 and 64 are provided by the potentiometer device 18 shown in FIGS. 1 and 3. The two movable contacts are provided by the rotor 20, and the resistance elements are provided by the stator 22. The two movable contacts move simultaneously, but are arranged so that one will reduce the resistance in the circuit and the other will increase the resistance. The capacitor in series with the reduced resistance will charge to fire the associated unijunction transistor. The resistance in series with the other capacitor will increase so that it will not charge to the threshold value of the unijunction transistor connected thereto.

In the circuit illustrated, four connections are required from the potentiometers 54 and 64 to the remainder of the control circuit, two for each resistance element. These connections are made through the slip rings 25, 26, 27 and 28 in the schematic diagram of FIG. 1. In some circuits, a common connection can be used for the circuits providing operation in opposite directions, so that only three slip rings are required for making the connections from the potentiometer device to the motor control circuit.

Considering now the operation of the system, when the pulse generator 34 applies pulses to the stepping motor 30, the rotor 20 of the device 18 rotates in a first direction to move the contact of potentiometer 54 to reduce the resistance connected in series with the capacitor 56. This causes the capacitor to charge to a voltage which exceeds the threshold of the unijunction transistor 48, so that current flows through resistor 50 to provide a voltage thereacross which triggers the silicon controlled rectifier 45. Accordingly, current flows through the silicon controlled rectifier 45 and the motor 10 to cause the same to rotate in a first direction. When the potentiometer 54 moves a greater extent, the resistance in the charging circuit for capacitor 56 will be further reduced so that the capacitor charges to the threshold voltage of the unijunction transistor more quickly. This causes the SCR 45 to conduct for a longer portion of each half cycle to apply more current to the motor so that it rotates faster.

As soon as the motor 10 starts to rotate, the coupling from the motor to the stator 22 of the potentiometer 18 (FIG. 1) will cause the stator to rotate in the first direction; that is, the same direction which the rotor has rotated. However, there will be some delay before the motor operates, so that the rotor will move ahead of the stator, and will be displaced from the stator. This will cause an increase in current to continue to be supplied to the motor so that it will continue to drive the apparatus being positioned at an increased velocity. It will be apparent that when the drive motor reaches speed to rotate the stator of the potentiometer at the same speed as the rotor, the current supplied to the drive motor will be constant so that the motor will continue to operate at constant speed. The system permits extensive continuous positioning movement, since both the rotor and stator of the potentiometer are mounted for movement. The maximum displacement of the rotor with respect to the stator is limited to an angle somewhat less than 360°. However, since the stator follows the rotor, the rotor can continue to move through more than one revolution, there being no limit to the extent of movement which is possible.

The stepping motor drive 30 can move the rotor 20 of the potentiometer 18 in the direction opposite to the first direction and this will cause the potentiometer 64 to reduce the resistance in the charging circuit for capacitor 66. Capacitor 66 will therefore charge, and when it reaches the threshold voltage of the unijunction transistor 58, this transistor will conduct to cause current flow through resistor 60. A voltage will therefore be developed across resistor 60 which turns on the silicon controlled rectifier 46 to provide current flow through motor 10 so that it rotates in the opposite direction. The coupling from the motor 10 back to the stator 22 of the potentiometer 18 will rotate the stator 22 in the opposite direction, so that it again follows the movement of the rotor.

The pulse generator 34 can be of the type which produces pulses at a repetition rate which can be controlled. By providing more rapid pulses, the stepping motor 30 will move faster to cause the drive motor to speed up more rapidly. The control unit 38 can control the pulse generator 34 to control the repetition rate of the pulses produced thereby.

FIG. 3 shows in more detail the construction of the stator 22 and rotor 20 of the potentiometer device 18. In FIG. 3 the device is shown enlarged axially to better illustrate the construction. The stator 22 includes a cylinder 70 which may be formed of a plastic insulating material. The cylinder 70 supports the resistance elements 54 and 64, which may be formed in circular shape. The movable contacts are formed by conducting arm 72 for resistance element 54 and arm 74 for resistance element 64. These arms are supported on conducting sleeves 73 and 75, respectively, mounted on the rotor shaft 21. In the event that the shaft 21 is made of conducting material, the sleeves 73 and 75 must be insulated therefrom. Engaging the sleeves 73 and 75 are fixed contact arms 76 and 77 which provide a connection from each movable contact to one end of the resistance element. As the shaft 21 and sleeves 73 and 75 are rotated, the contact arms 76 and 77 provide a continuous connection thereto.

The contact arms 72 and 74 and the supporting sleeves 73 and 75, together with the shaft 21, form the rotor 20 of the potentiometer device. The cylindrical housing 70 of the stator, in addition to supporting the resistance elements 54 and 64, also supports the slip rings 25, 26, 27 and 28. These are connected to the resistance elements 54 and 64, as shown in FIGS. 2 and 3. The housing 70 is mounted to shaft 23, so that the stator 22 can be rotated to follow the rotation of the rotor 21, as has been described. The showing of the potentiometer device in FIG. 3 is representative of other constructions which can be used. Commercially available potentiometer devices can be used to provide the resistance elements 54 and 64 and the movable contacts which engage the same.

Figure 4:
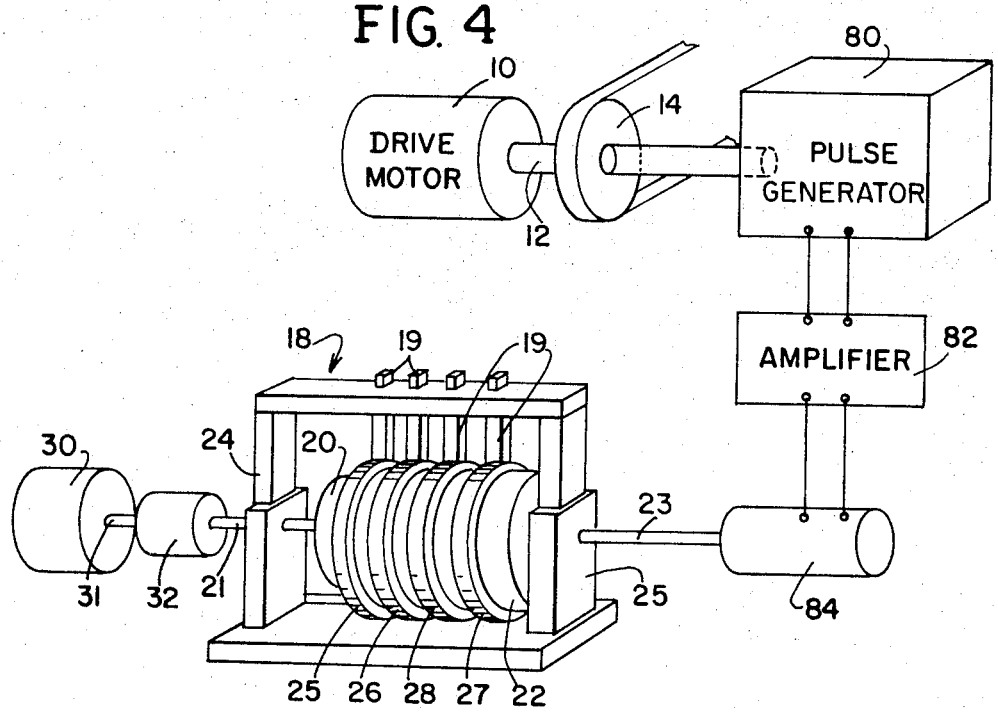
FIG. 4 shows an alternate construction of the coupling from the motor to the potentiometer.

FIG. 4 shows an alternate construction of the coupling from the drive motor 10 to the stator of the potentiometer 18. In this construction, a pulse generator 80 is coupled to the drive shaft 12 of the motor and produces pulses which represent the rotation of the shaft 12. The pulse generator 80 is coupled through an amplifier 82 to a stepping motor 84, which is connected to the shaft 23 of the potentiometer device 18. Accordingly, the stepping motor 84 will cause the stator 22 to follow the movement of the rotor 20, which is moved by the stepping motor 30. This electrical coupling of the motor back to the potentiometer device may be preferable in many applications wherein it is desirable to locate the potentiometer device 18 remotely from the drive motor 10. It is obvious that the coupling to the stator may be directly from the device being positioned, which moves in accordance with the operation of the drive motor. In such case, the pulse generator 80 can be connected to the device being positioned rather than to the motor shaft.

The remote position control system of the invention has been found to be highly effective to control the position of a member by control of the operation of a motor which positions the member. The control system is of general application and can be used with motors of various sizes and speeds, as may be required in different applications. The system can be used for high or low speed movement, and when used at high speed will start and stop slowly, to thereby provide accurate control. The accuracy of the system is limited by the movement of a single step of the stepping motor. This can be made as small as desired, and the amount of travel is not limited by the extent of this step as there is no limit to the number of steps and revolutions which can be used.

The position control device can be used in a system with other positioning devices, such as a multiaxis machine tool, wherein a plurality of axes are digitally controlled. The control unit can be part of a complex control system which is remotely controlled and provide control of other associated equipment. For example, a radio link may be used to provide control to a moving object.

We claim:

1. A motor positioning system including in combination, an electric drive motor having a drive shaft for connection to apparatus to be positioned thereby, a control circuit for supplying electric current to said drive motor, said control circuit including a control device having first and second relatively movable parts and causing said control circuit to supply current to said drive motor in accordance with the relative position of said parts, input means independent of said drive motor coupled to one of said parts for moving the same in accordance with the desired position of the connected apparatus, and means coupling said drive shaft to the other one of said parts.

2. The positioning system of claim 1 wherein said control device is a potentiometer having a stator and a rotor, and said first and second relatively movable parts are said rotor and said stator, said potentiometer providing a resistance in said control circuit which varies with the relative position of said rotor and said stator.

3. The positioning system of claim 1 wherein said input means for moving said one part includes a stepping motor and pulse means for applying pulses to said stepping motor.

4. The positioning system of claim 3 further including a counter connected to said pulse means for terminating the application of pulses to said stepping motor when a predetermined number of pulses have been applied from said pulse means.

5. The positioning system of claim 4 wherein said counter includes means for setting the same to a particular count.

6. The positioning system of claim 1 wherein said first and second parts of said control device have a first relative position which causes said control circuit to apply no current to said motor, with movement of said one part changing the relative position so that said control circuit supplies current to said motor, and movement of said other part causing said parts to return to said first relative position so that said control circuit terminates the supply of current to said motor.

7. The positioning system of claim 1 wherein said control circuit includes a first portion for supplying current to said drive motor for operating the same in a first direction of rotation and a second portion for supplying current to said drive motor for operating the same in the opposite direction of rotation.

8. The positioning system of claim 7 wherein said control device includes first and second potentiometers having movable parts connected together, with said first potentiometer being effective to control the supply of current to said motor to cause rotation in said first direction and said second potentiometer being effective to control the supply of current to said motor to cause rotation in said opposite direction.

9. The positioning system of claim 1 wherein said means coupling said drive shaft to the other one of said parts of said control device includes a mechanical coupling interconnecting said drive shaft and said other one of said parts.

10. The positioning system of claim 1 wherein said means coupling said drive shaft to the other one of said parts includes a pulse generator coupled to said drive shaft, a stepping motor coupled to said other one of said parts of said control device, and means coupling said pulse generator to said stepping motor to move said other one of said parts so that it follows the movement of said one part.

11. A control system for controlling the operation of a direct current motor including in combination, a control circuit adapted to be connected to an alternating current supply and including rectifier means coupled to the motor for supplying the unidirectional current thereto, said control circuit including a control device having first and second relatively movable parts and control means coupling said control device to said rectifier means to control the current supplied thereby, input means coupled to one of said parts of said control device including input signal means, and means responsive thereto for moving said one part in a manner related to the desired operation of the motor, and means coupling the motor to the other one of said parts of said control device for moving the same in accordance with the operation of the motor.

12. The control system of claim 11 wherein said rectifier means includes first and second silicon controlled rectifiers for supplying current of opposite polarities, and said control device includes a potentiometer having first and second portions coupled to said first and second silicon controlled rectifiers, respectively, for controlling the current supplied thereby, whereby said control circuit controls the direction and speed of the direct current motor.

13. The control system of claim 12 wherein said means for moving said one part of said control device includes a stepping motor, and said input signal means includes pulse generator means connected to said stepping motor for applying pulses thereto to operate the same by steps.

14. The control system of claim 13 wherein said parts of said control device have a first relative position at which said control circuit causes said rectifier means to supply no current to the motor, and said first part is movable in a first direction to cause rotation of the motor in a first direction which causes said second part to move in said first direction toward said first relative position, and said first part is movable in a direction opposite to said first direction to cause the motor to rotate in the opposite direction which causes said second part to move in said opposite direction.

15. The positioning system of claim 2 wherein said control device includes slip ring means connected to said potentiometer having fixed terminals and providing connections thereto from said rotor and said stator.

* * * * *